Patented Oct. 19, 1948

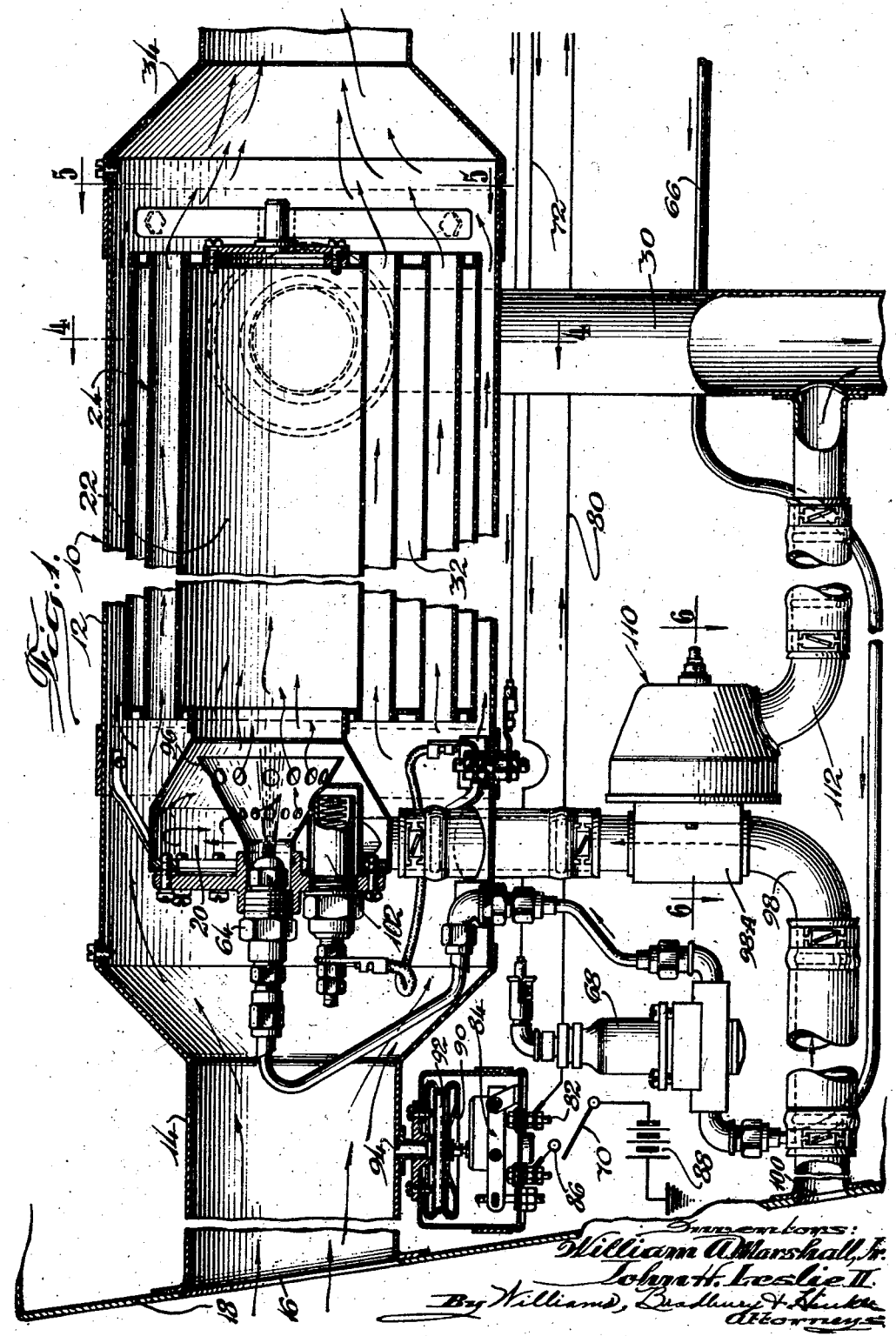

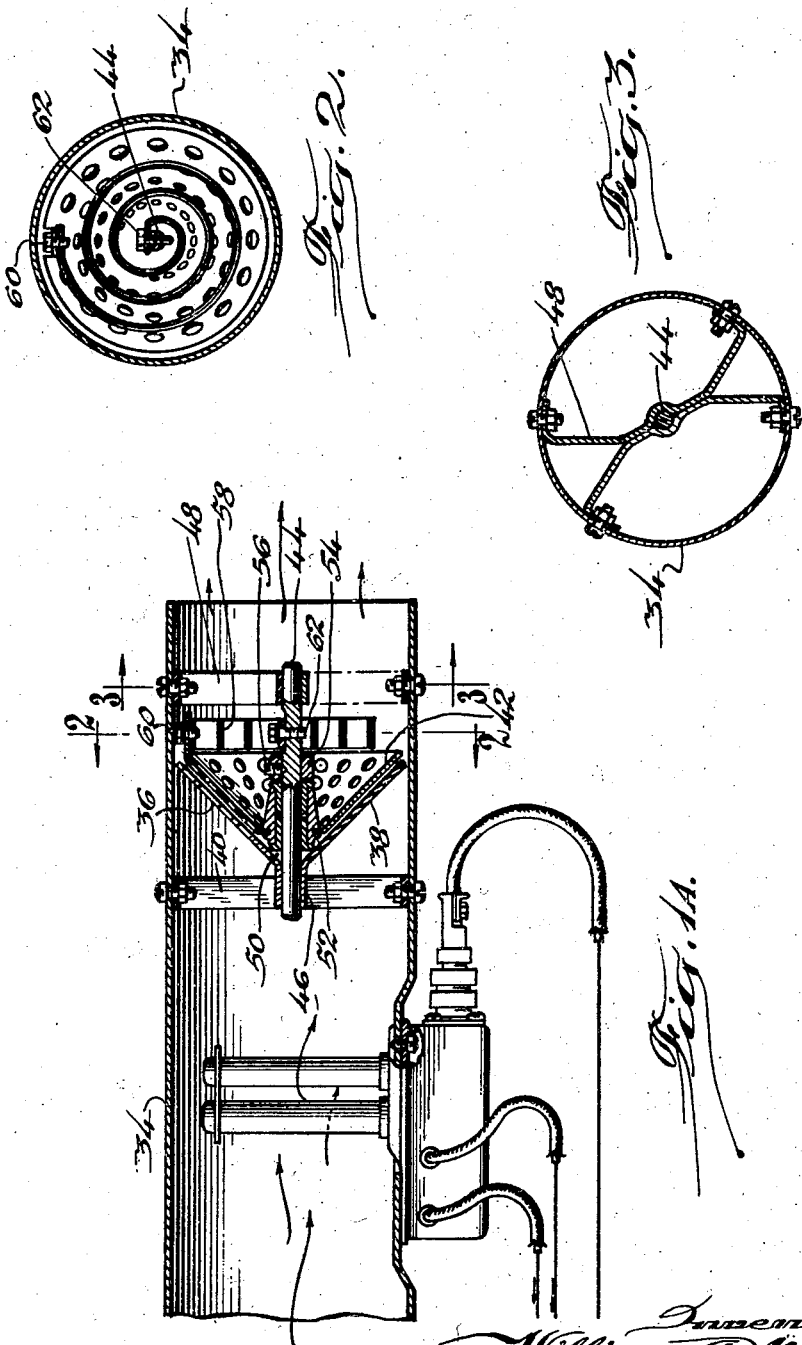

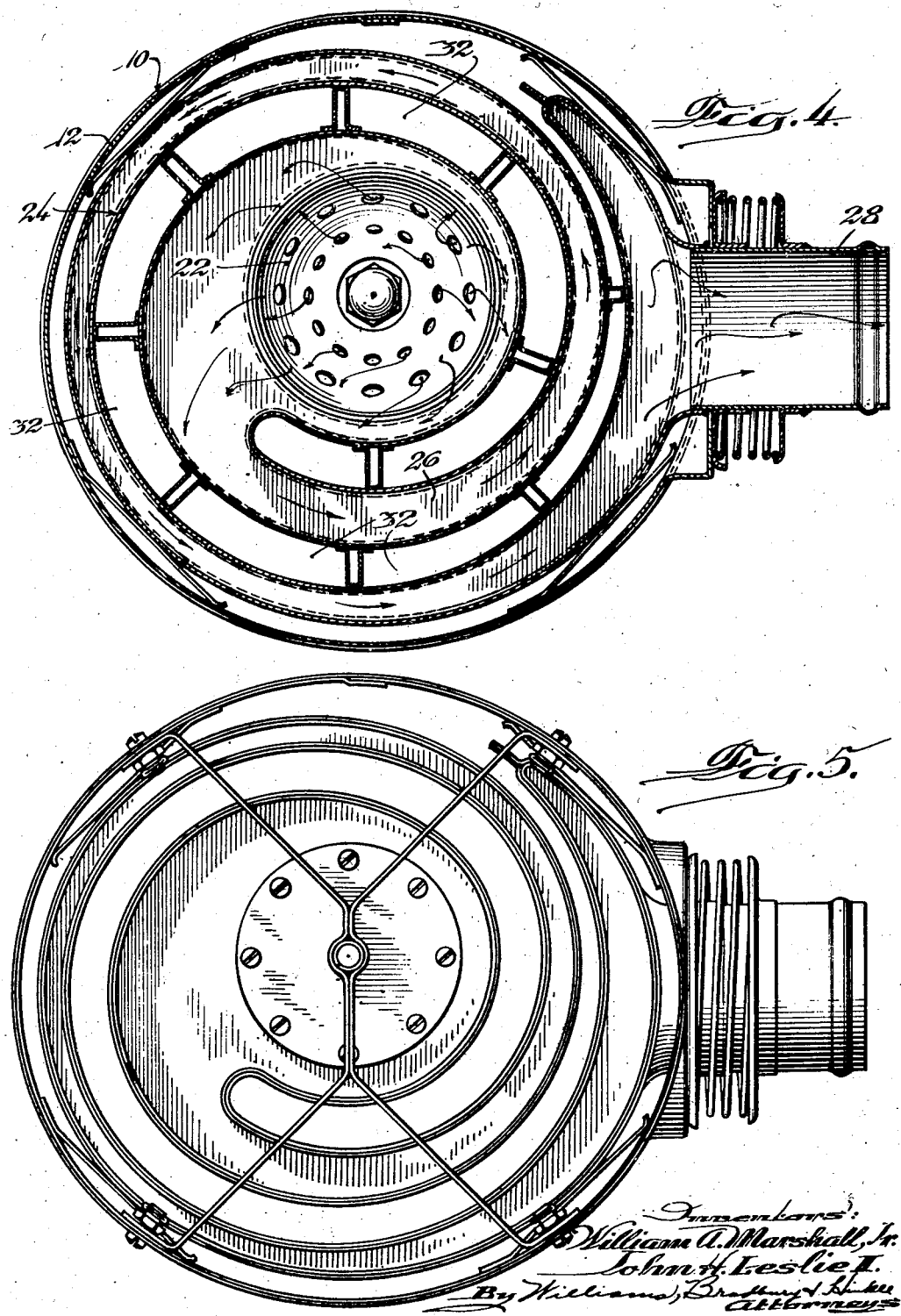

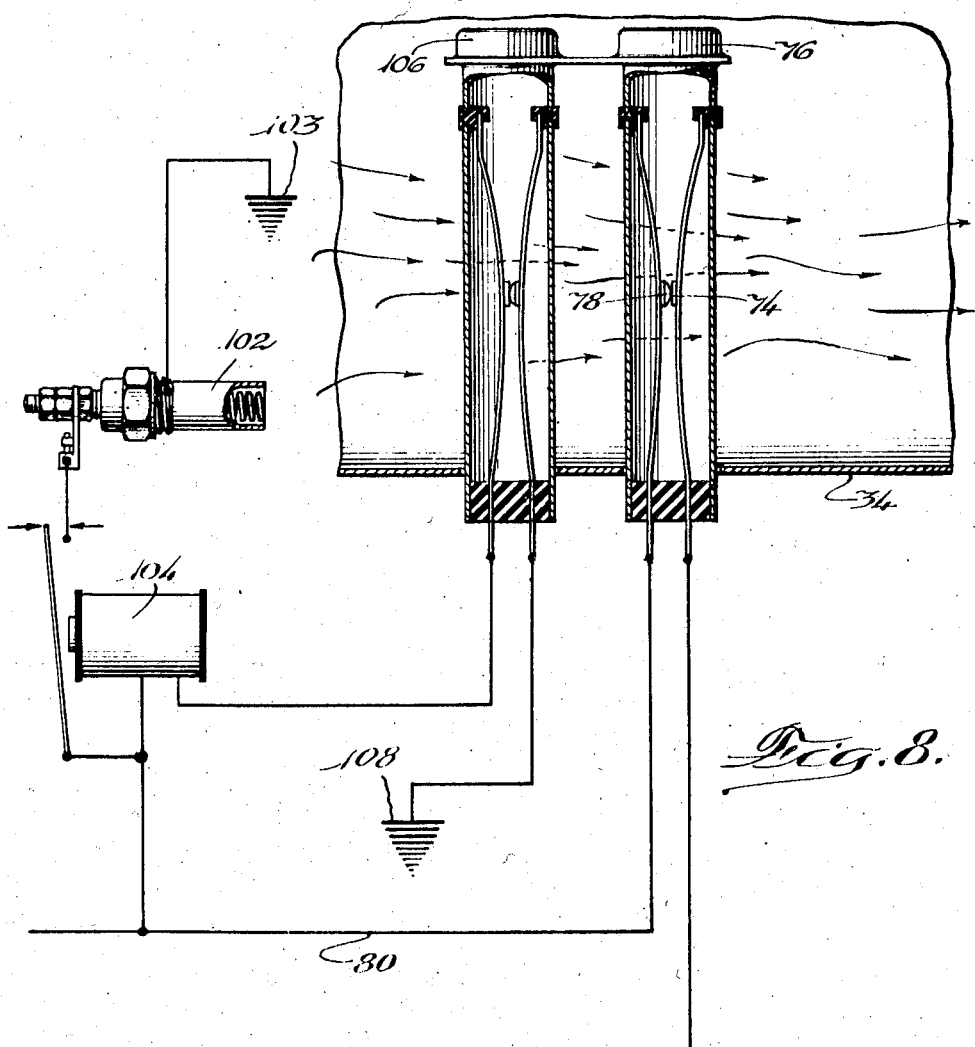
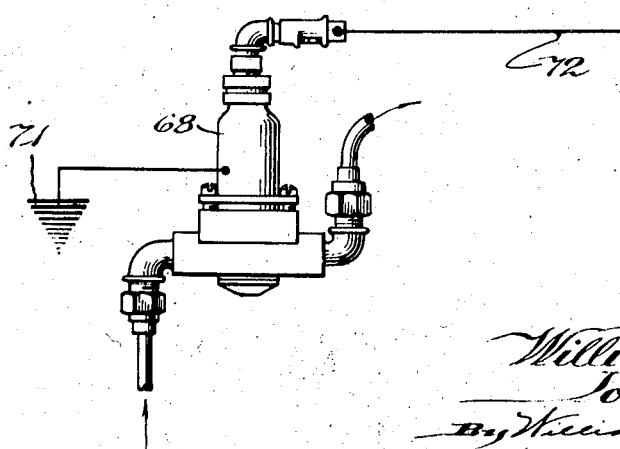
Fig. 8.

2,451,625

UNITED STATES PATENT OFFICE 2,451,625

AIR PRESSURE RESPONSIVE CONTROL FOR INTERNAL-COMBUSTION HEATERS

William A. Marshall, Jr., Chicago, and John H. Leslie, II, Winnetka, Ill., assignors to Stewart-Warner Corporation, Chicago, Ill., a corporation of Virginia Application December 13, 1943, Serial No. 514,078

5 Claims. (Cl. 126—110)

Our invention relates to controls for heating systems and more particularly to controls for heating systems of the internal combustion type used on aircraft.

In aircraft heating systems, it is common to provide an internal combustion heater supplied with combustion and ventilating air by a ram or rams located in a forward surface of the aircraft and so positioned that movement of the aircraft creates a flow of air through the ram and heater. In such heating systems, the quantity of air delivered by a ram varies both with the speed of the aircraft and the altitude at which the aircraft is operating. Where fuel is supplied at a fixed rate to the aircraft heater under varying conditions of altitude and speed, it is desirable to supply a uniform mass rate of combustion air under all speed and altitude conditions of aircraft operation.

An object of our invention is to provide a control for heating systems of the foregoing type having means for supplying an approximately uniform mass rate of combustion air to the internal combustion heater under varying speed and altitude conditions.

Another object of our invention is to provide a new and improved valve to compensate for variations in speed and altitude.

Other objects and advantages will become apparent as the description proceeds.

In the drawings:

Fig. 1 is a view showing a preferred embodiment of our invention and illustrating the heater and certain other parts in section;

Fig. 1A is a continuation of the righthand end of Fig. 1;

Fig. 2 is a transverse, sectional view taken on the line 2—2 of Fig. 1A and shows details of a thermostatically controlled ventilating air valve;

Fig. 3 is a transverse, sectional view taken on the line 3—3 of Fig. 1A and shows details of a support for the ventilating air valve;

Fig. 4 is a transverse, sectional view of the heat exchanger and is taken on the line 4—4 of Fig. 1;

Fig. 5 is a transverse, sectional view taken on the line 5—5 of Fig. 1 and shows an end view of the heat exchanger;

Fig. 8 is a diagrammatic view showing details of the electrical control circuits.

Figure 6:
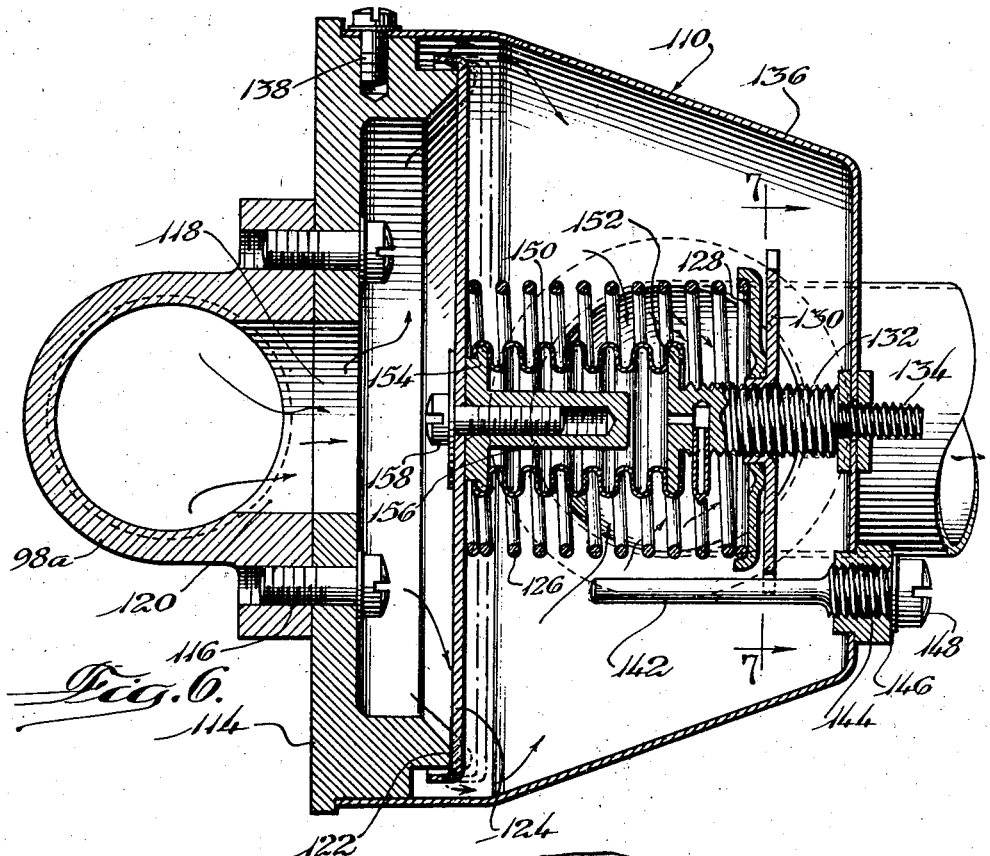
Fig. 6 is a transverse, sectional view through the compensating valve and is taken on the line 6—6 of Fig. 1.

In Fig. 1, we have illustrated our invention as being applied to a heater indicated generally by reference character 10 having a cylindrical casing 12 whose lefthand or inlet end is connected to a ventilating air supply pipe 14 in communication with a ventilating air ram 16 located in a forward surface 18 of an aircraft fuselage wing or other structural part. The heater 10 has a combustion chamber 20 which discharges hot products of combustion into the central gas passage 22 of a spiral heat exchanger 24, which is illustrated as being of the type described and claimed in the co-pending application of William C. Parrish, Serial No. 494,155, filed July 10, 1943. As most clearly shown in Fig. 4, the central gas passage 22 communicates wth a spiral gas passage 26 leading to an exhaust outlet 28 connected to an exhaust pipe 30.

Ventilating air entering the ram 16 passes lengthwise of the ventilating air pipe 14 and into the lefthand end of the heater casing 12. This air flows about the combustion chamber 20 and absorbs some heat from the walls thereof. The ventilating air then flows through the air passages 32 in the heat exchanger 24 and absorbs additional heat from the walls of these passages. The ventilating air then passes from the righthand end of the casing 12 into a duct 34 which may communicate directly with an aircraft cabin or other space to be heated, or which may have a plurality of outlets located in the same or different spaces.

In Fig. 1A, we have illustrated a thermostatic ventilating air control valve 36 as being located in the duct 34. This valve comprises a stationary cone 38 mounted in a supporting spider 40 bolted or otherwise attached to the wall of the duct 34. A rotatable cone 42 is located in the stationary cone 38 and is mounted on a shaft 44 having one end supported in a tubular extension 46 of the cone 38. The other end of the shaft 44 is supported in a second spider 48. The shaft 44 is secured to the fixed cone 36 as by means of solder 50, or in any other suitable manner.

The rotatable cone 42 is mounted on a bearing member 52 rotatably carried on the shaft 44 and held against longitudinal displacement by a collar 54 secured to the shaft 44 by a set screw 56. A thermostat 58 in the form of a bi-metallic strip spirally arranged has one end attached by a screw 60 to the rotatable cone 42 and the other end attached by a screw 62 to the shaft 44.

Each of the cones is provided with rows of holes which are brought into more or less registry with each other as the rotatable cone is shifted by the thermostat 58 which responds to the temperature of the ventilating air in the duct 34. It is not necessary that the valve completely seal the duct 34 against flow therethrough and in fact it is desirable that some slight flow occur even when the valve is in fully closed position, so that some heat will be transmitted to the operating thermostat 58 when the heater is started. It is, therefore, unnecessary to have the cones 36 and 38 closely fit each other and some slight space is preferably provided therebetween. This loose fit of the two cones simplifies production problems in manufacturing the valve and also prevents the valve from sticking if either of the cones should warp slightly.

Fuel is injected into the combustion chamber in the form of a fine spray through a nozzle 64 which is supplied with fuel through a pipe 66 connected with a source of fuel under constant pressure. A solenoid valve 68 is located in the fuel supply pipe and cuts off the supply of fuel to the nozzle 64 when the master heater control switch 70 for starting and stopping the heater is open. We also provide controls for automatically closing this solenoid valve whenever insufficient ventilating air is supplied by the ram 16 and whenever the ventilating air in the duct 34 attains an unduly high temperature.

Referring to Figs. 1, 1A and 8, it will be seen that the solenoid valve 68 has one side grounded, as indicated at 71, and the other side connected by conductor 72 to contact 74 of a Fenwall switch 76 located in the ventilating air duct 34. The other contact 78 of the switch 76 is connected by conductor 80 to the terminal 82 of a switch 84 which is controlled by the pressure in the ventilating air supply pipe 14. The other terminal 86 of the switch 84 is connected to the battery or other source of current 88 through the master switch 70. The switch 84 is controlled by a diaphragm 90 whose lower side is exposed to atmospheric pressure and whose upper side is exposed to the pressure in a diaphragm chamber 92 which communicates with the ventilating air supply pipe 14 through a nipple 94. The operation of this switch 84 is such that the switch is normally open and closes only when the pressure in the ventilating air supply pipe 14 is sufficient to afford the smallest desirable flow of ventilating air for the heater 10.

The Fenwall switch 76 is set to remain closed except when the ventilating air in the duct 34 attains an undesirably high temperature, which causes this switch to open and break the circuit to the solenoid valve 68, thereby cutting off the supply of fuel to the nozzle 64. As soon as the temperature of the air in the duct 34 drops appreciably, the Fenwall switch 76 will again close and heater operation will be resumed if the manual control switch 70 and ventilating air responsive switch 84 remain closed. From the foregoing, it is apparent that the supply of fuel to the nozzle is controlled by three switches arranged in series and that the supply of fuel to the nozzle is cut off as soon as any one of these switches opens.

The fuel delivered to the combustion chamber 20 by the nozzle 64 is discharged substantially axially of a perforated sheet metal cone 96. Combustion air is supplied to the combustion chamber through combustion air pipe 98 connected to a combustion air ram 100 illustrated as located in the same surface 18 containing the ventilating air ram 16, although if desired these rams may be located in different parts of the airplane structure. Part of the combustion air supplied to the combustion chamber flows through the perforations in the cone 96 to unite with the fuel spray and the remainder of the combustion air flows around the large end of this cone to mix with the fuel.

The mixture of fuel and air created in the combustion chamber is initially ignited by an electrical igniter 102, which is disconnected from its source of current after the heater attains normal operation. The control circuit for this igniter is best shown in Fig. 8. One side of the electrical igniter 102 is grounded to the wall of the combustion chamber, as indicated at 103, whereas the other side of this igniter is adapted to be connected by a relay 104 to the conductor 80 leading to the battery 88 through the main switch 70 and ventilating air control switch 84. The circuit for energizing the relay 104 is controlled by a second Fenwall switch 106 also located in the ventilating air duct 34 and having one contact grounded, as indicated at 108. The Fenwall switch 106 is normally closed when the heater is not operating and remains closed after operation is initiated until the ventilating air in the duct 34 attains a predetermined temperature, whereupon this switch 106 opens to break the relay circuit and thereby cut off the supply of current to the igniter 102. The switch 106 remains in open position as long as the air in the duct 34 is at this predetermined temperature or any higher temperature.

The normal tendency of the rams 16 and 100 is to increase the supply of ventilating air and combustion air with increases in aircraft speed. The mass of the air supplied by these rams also varies with the altitude at which the aircraft is operating, being less at high altitudes and greater at low altitudes. The thermostatic ventilating air valve located in the duct 34 prevents the ram 16 from supplying a greater mass of ventilating air than can be properly heated by the heater 10. This thermostatic valve also tends to compensate for variations in ventilating air flow through the heater, due to opening or closing shutters controlling outlets connecting the duct 34 with cabins or other spaces receiving ventilating air.

An important feature of our invention lies in the provision of means for regulating the supply of combustion air to the combustion chamber to afford a substantially uniform mass of combustion air for all variations in speed and altitude. This means comprises a speed and altitude compensating valve 110 controlling communication between the combustion air supply pipe 98 and a bypass pipe 112 leading to the exhaust pipe 30, whereby excess of combustion air supplied by the ram 100 is discharged into the exhaust pipe 30 and does not enter the combustion chamber.

Figure 7:
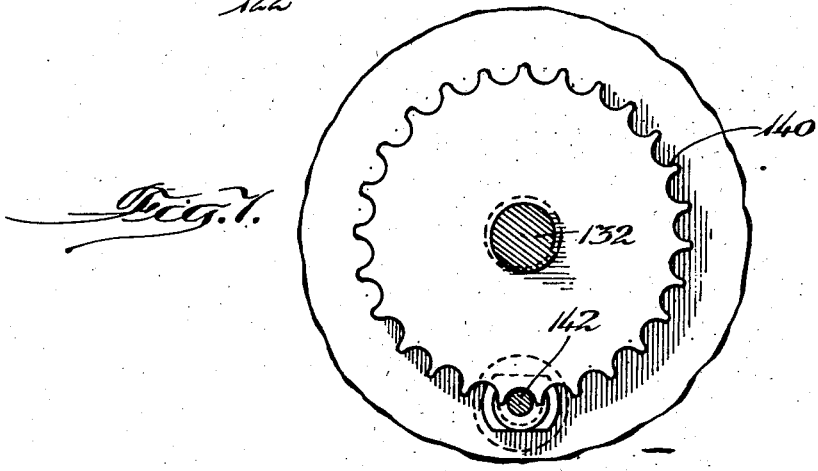
Fig. 7 is a transverse, sectional view taken on the line 7—7 of Fig. 6 showing details of the valve adjustment.

This combustion air control valve is best shown in Figs. 6 and 7 and comprises a base 114 attached by screws 116 to a pipe section 98A forming a part of the combustion air supply pipe 98. The base 114 has an air inlet opening 118 communicating with a lateral opening 120 in the wall of pipe section 98A. The base 114 also provides a seat 122 for a sheet metal valve 124 which is urged towards its seat by a spring 126.

The other end of the spring 126 rests against a washer 128 supported by a sheet metal nut 130 rotatable on a screw 132 having a reduced threaded extension 134 secured to the base of a cup shaped housing 136 enclosing the valve member 124, spring 126, and associated parts. A housing 110 is secured to the base 114 by screws 138, or in any other suitable manner. The nut 130 has a scalloped edge 140 normally engaged by a pin 142 to hold the nut 130 in adjusted position.

The pin 142 has an enlarged, threaded portion 144 secured in a ferrule 146 attached to the base of the housing 136 and this end of the pin is provided with an enlarged head having a screw driver kerf 148. The tension of spring 125 may be adjusted by unscrewing pin 142 and using the smooth portion of this pin as a pry to rotate the nut 130 in the desired direction, the threaded opening in the ferrule 146 being sufficiently bigger than the smooth end of the pin 142 to permit such use of this pin.

Altitude compensation for the valve member 124 is provided by an evacuated sylphon 150, having one end formed by the enlarged portion 152 of the screw 132. The other end of this sylphon is formed by a plate 154 having a threaded extension 156 secured to the valve member 124 by a screw 158.

The differential pressure across the valve part 124 will increase with increases in speed of the aircraft and decrease with decreases in speed of the aircraft. This is true both where the outlet end of the exhaust pipe 30 is arranged to create a suction in this pipe when the aircraft is in motion and when the outlet end of this exhaust pipe is arranged to create no appreciable suction in this pipe with motion of the aircraft. When the differential pressure between the combustion air pipe 98 and exhaust pipe 30 is sufficient to deliver more than the desired quantity of combustion air to the combustion chamber, valve member 124 moves to increase its opening in response to this pressure differential and permits the excess air delivered by the ram 100 to flow through the bypass 112 directly into the exhaust pipe so that approximately the desired amount of combustion air is delivered to the combustion chamber.

The degree of opening of the valve member 124 is thus varied by the variations in differential pressure across this valve member so that the amount of air bypassed to the exhaust pipe fairly approximates, within permissible limits, the excess air delivered by the ram 100. The aneroid formed by the bellows 150 acts to increase the spring load on the valve member 124 with a decrease in ambient atmospheric pressure, thereby providing the necessary increase in pressure differential across the combustion side of the heater to maintain an approximately constant weight flow of combustion air.

From the foregoing description taken in connection with the accompanying drawings, it will be apparent that we have provided a control which is inexpensive to manufacture and install and which insures safe and efficient operation of the heating system under the widely varying conditions encountered in aircraft use. While we have illustrated and described in detail only a single embodiment or our invention, it is to be understood that our invention is not limited to the particular details shown and described but may assume numerous other forms and that our invention includes all modifications, variations and equivalents coming within the appended claims.

We claim:

1. A heating system of the class described, comprising an internal combustion heater, means for supplying fuel thereto, a ram for supplying combustion air to said heater, an exhaust pipe for discharging products of combustion from said heater, means for supplying ventilating air to said heater, means forming a bypass connecting said ram with said exhaust pipe, and a valve interposed in said bypass and controlling air flow through said bypass to vary the mass of air flow to said combustion chamber with variations in speed and altitude, said valve including a valve member subject to the pressure differential between the ram and the exhaust pipe, with spring means urging said valve toward closed position, and an evacuated sylphon connected to said valve member operable to supplement the pressure of said spring means upon decrease of ambient atmospheric pressure.

2. A heating system for aircraft, comprising an internal combustion heater, means for supplying a uniform flow of fuel thereto, a ram for supplying combustion air to said heater, an exhaust pipe for discharging products of combustion from said heater, means for supplying ventilating air to said heater, a bypass connecting said ram with said exhaust pipe, valve means controlling air flow through said bypass in response to the ram pressure to vary the mass of air flow to said combustion chamber with variations in speed of the aircraft, and means responsive to variations in ambient atmospheric pressure for regulating said valve to compensate for altitude variations and operative to increasingly resist the opening of said valve with increase of altitude.

3. Apparatus of the class described, comprising an aircraft heater having a combustion chamber, means for supplying a uniform flow of fuel to said chamber throughout varying conditions of aircraft operation, a ram for supplying air to said combustion chamber, a pipe connecting said ram with said combustion chamber, an opening in said pipe, and a valve means responsive to variations of ram pressure for regulating escape of air through said opening, together with means responsive to variations in ambient atmospheric pressure connected to said valve and operable to modify the effect of said ram pressure thereon by increasingly resisting the opening of said valve with increase of altitude.

4. Apparatus of the class described, comprising a heater having a combustion chamber, means for supplying fuel to said chamber, a ram for supplying combustion air to said chamber, a pipe connecting said ram with said chamber, means forming an escape outlet in said pipe, an exhaust pipe through which products of combustion from said combustion chamber are discharged to atmosphere, a valve controlling flow of air through said escape outlet, said valve including a valve member responsive to pressure differentials between said escape outlet and said ram, spring means urging said valve member toward closed position, and means forming an evacuated chamber having a movable wall connected to said valve member and operable to supplement the load of the spring means upon decrease of ambient atmospheric pressure.

5. Apparatus of the class described comprising an internal combustion heater, means for supplying ventilating air to said heater, a pipe for supplying fuel to said heater, a pipe for supplying combustion air to said heater, a valve for cutting off fuel supply to said heater, means responsive to the pressure of the air supplied at the ventilating air inlet of said heater for controlling said valve, said last-named means being independent of the pressure in said last-named pipe and functioning to open said valve when the pressure in said ventilating air supply means is equal to or above a predetermined minimum, and means located at said heater outlet and responsive directly to the temperature of ventilating air flowing from the heater for controlling said valve, said last-named means being interconnected with and rendered operative by said second-named means and functioning to cause closing of said valve when the temperature of the ventilating air leaving the heater is equal to or above a predetermined maximum.

WILLIAM A. MARSHALL, Jr.
JOHN H. LESLIE, II.

REFERENCES CITED

The following references are of record in the file of this patent:

UNITED STATES PATENTS

| Number | Name | Date |
| --- | --- | --- |
| 897,732 | Gerdes | Sept. 1, 1908 |
| 1,343,098 | Stephens | June 8, 1920 |
| 1,562,663 | Strong | Nov. 24, 1925 |
| 1,765,549 | Thurm | June 24, 1930 |
| 1,779,162 | Evers et al. | Oct. 21, 1940 |
| 1,834,958 | Martin | Dec. 8, 1931 |
| 1,919,413 | Buck | July 25, 1933 |
| 2,112,391 | Anxionnaz | Mar. 29, 1938 |
| 2,137,581 | Myler | Nov. 22, 1938 |
| 2,189,382 | McGrath | Feb. 6, 1940 |
| 2,197,746 | Matthes | Apr. 16, 1940 |
| 2,286,853 | Holthouse | June 16, 1942 |
| 2,313,149 | Jacobsson | Mar. 9, 1943 |
| 2,314,089 | Hess et al | Mar. 16, 1943 |
| 2,364,458 | McCollum | Dec. 5, 1944 |
| 2,418,566 | Arnhym | Apr. 8, 1947 |